US007216437B2

(12) United States Patent
Gordin et al.

(10) Patent No.: US 7,216,437 B2
(45) Date of Patent: May 15, 2007

(54) FIELD AIMING LIGHT FIXTURES BY USING IMPRINTED RING ON FIXTURE LENS

(75) Inventors: Myron K. Gordin, Oskaloosa, IA (US); Timothy J. Boyle, Oskaloosa, IA (US)

(73) Assignee: Musco Corporation, Oskaloosa, IA (US)

( * ) Notice: Subject to any disclaimer, the term of this patent is extended or adjusted under 35 U.S.C. 154(b) by 0 days.

(21) Appl. No.: 11/334,685

(22) Filed: Jan. 18, 2006

(65) Prior Publication Data

US 2006/0176709 A1 Aug. 10, 2006

Related U.S. Application Data

(60) Provisional application No. 60/644,637, filed on Jan. 18, 2005, provisional application No. 60/644,639, filed on Jan. 18, 2005, provisional application No. 60/644,536, filed on Jan. 18, 2005, provisional application No. 60/644,747, filed on Jan. 18, 2005, provisional application No. 60/644,534, filed on Jan. 18, 2005, provisional application No. 60/644,720, filed on Jan. 18, 2005, provisional application No. 60/644,688, filed on Jan. 18, 2005, provisional application No. 60/644,636, filed on Jan. 18, 2005, provisional application No. 60/644,517, filed on Jan. 18, 2005, provisional application No. 60/644,609, filed on Jan. 18, 2005, provisional application No. 60/644,516, filed on Jan. 18, 2005, provisional application No. 60/644,546, filed on Jan. 18, 2005, provisional application No. 60/644,547, filed on Jan. 18, 2005, provisional application No. 60/644,638, filed on Jan. 18, 2005, provisional application No. 60/644,537, filed on Jan. 18, 2005, provisional application No. 60/644,637, filed on Jan. 18, 2005, provisional application No. 60/644,719, filed on Jan. 18, 2005, provisional application No. 60/644,784, filed on Jan. 18, 2005, provisional application No. 60/644,687, filed on Jan. 18, 2005.

(51) Int. Cl.
*G01C 15/00* (2006.01)

(52) U.S. Cl. ........................................ 33/286; 33/228

(58) Field of Classification Search .................. 33/227, 33/228, 286, 287, 288, 297, 298, 299, 613, 33/645; 362/250, 372, 383, 431

See application file for complete search history.

(56) References Cited

U.S. PATENT DOCUMENTS 2,447,923 A 8/1948 Tuck (Continued)

FOREIGN PATENT DOCUMENTS

EP 1 172 839 A2 1/2002

*Primary Examiner*—G. Bradley Bennett
(74) *Attorney, Agent, or Firm*—McKee, Voorhees & Sease, P.L.C.

(57) ABSTRACT

An apparatus and method for checking alignment of a lighting fixture comprising a lighting fixture with a housing, reflective surface in the housing, light source in the housing, and a glass lens over an opening into the housing. A marking or indicia is placed on the glass lens in a known orientation with structure inside the housing that is visible from outside of the housing. By line of sight viewing of the marking or indicia, even from a distance away, an alignment of the marking or indicia with the structure inside the housing, the alignment or aiming orientation of the fixture can be determined. This can be used to check alignment of individual fixture, or can be used to check alignment of an array of fixtures, if the array has a known reference correlation to the fixture with the marking or indicia.

13 Claims, 3 Drawing Sheets

U.S. PATENT DOCUMENTS

| | | | | |
|---|---|---|---|---|
| 4,226,530 | A * | 10/1980 | Broom | 33/288 |
| 4,450,507 | A * | 5/1984 | Gordin | 362/431 |
| 4,816,974 | A | 3/1989 | Gordin | |
| 4,947,303 | A | 8/1990 | Gordin et al. | |
| 5,012,398 | A * | 4/1991 | Jones et al. | 362/250 |
| 5,161,883 | A | 11/1992 | Gordin et al. | |
| 5,600,537 | A | 2/1997 | Gordin et al. | |
| 5,816,691 | A | 10/1998 | Gordin et al. | |
| 5,856,721 | A | 1/1999 | Gordin et al. | |
| 6,036,338 | A | 3/2000 | Gordin | |
| 6,203,176 | B1 | 3/2001 | Gordin | |
| 6,833,675 | B2 | 12/2004 | Gordin | |
| 2001/0029675 | A1* | 10/2001 | Webb | 33/286 |
| 2003/0051355 | A1* | 3/2003 | Phuly et al. | 33/286 |
| 2003/0137840 | A1* | 7/2003 | Citron et al. | 362/250 |
| 2003/0210549 | A1* | 11/2003 | Sears et al. | 362/431 |
| 2005/0115095 | A1* | 6/2005 | Kurfiss et al. | 33/613 |

* cited by examiner

FIELD AIMING LIGHT FIXTURES BY USING IMPRINTED RING ON FIXTURE LENS

CROSS REFERENCE TO RELATED APPLICATIONS

This application claims priority under 35 U.S.C. § 119 of a provisional application U.S. Ser. No. 60/644,637 filed Jan. 18, 2005, herein incorporated by reference in its entirety. This application is also a non-provisional of the following provisional U.S. applications, all filed Jan. 18, 2005: U.S. Ser. No. 60/644,639; U.S. Ser. No. 60/644,536; U.S. Ser. No. 60/644,747; U.S. Ser. No. 60/644,534; U.S. Ser. No. 60/644,720; U.S. Ser. No. 60/644,688; U.S. Ser. No. 60/644,636; U.S. Ser. No. 60/644,517; U.S. Ser. No. 60/644,609; U.S. Ser. No. 60/644,516; U.S. Ser. No. 60/644,546; U.S. Ser. No. 60/644,547; U.S. Ser. No. 60/644,638; U.S. Ser. No. 60/644,537; U.S. Ser. No. 60/644,719; U.S. Ser. No. 60/644,784; U.S. Ser. No. 60/644,687, each of which is herein incorporated by reference in its entirety.

INCORPORATION BY REFERENCE

The contents of the following U.S. Patents Nos. are incorporated by reference by their entirety: 4,816,974; 4,947,303; 5,161,883; 5,600,537; 5,816,691; 5,856,721; 6,036,338.

I. BACKGROUND OF THE INVENTION

A. Field of the Invention

The present invention relates to lighting fixtures that produce high intensity, controlled, and concentrated light beams for use at relatively distant targets. In particular, the invention relates to such lighting fixtures, their methods of use, and their use in systems where a plurality of such fixtures are used in combination, usually elevated on poles, to compositely illuminate a target area energy-efficiently, with reduced glare and spill light. One primary example is illumination of a sports field.

B. Problems in the Art

Figure 1A:
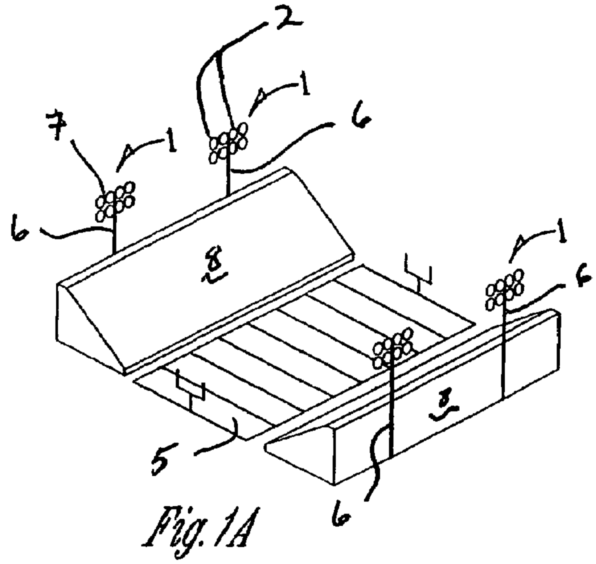
Figure 1B:
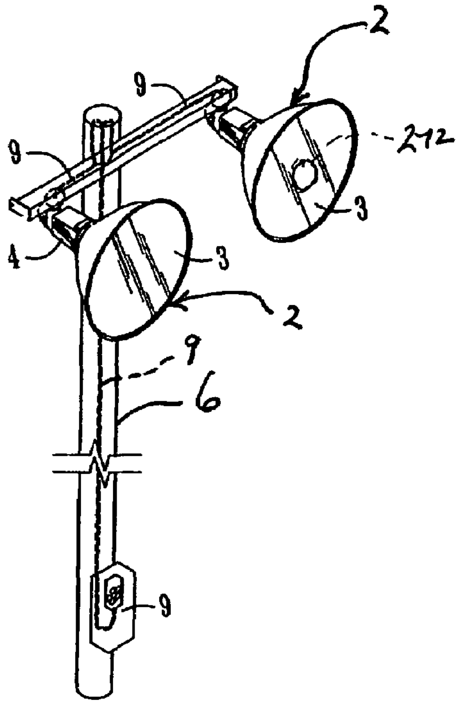

Illumination of sports fields is generally called sports lighting. FIGS. 1A–1G illustrate one such sports lighting configuration. Football field 5 of FIG. 1A is illuminated by a set of arrays 1 of light fixtures 2 elevated on poles 6 (see FIG. 1A). As is well known in the art, there are known methods to design the number, type, and position of poles 6 and fixtures 2 to provide a desired or required amount and uniformity of light for the field. There are usually pre-designed lighting quantity and uniformity specifications to follow.

In recent times, sports lighting has also had to deal with the issue of glare and spill light. For example, if light travels outside the area of the sports field, it can spill onto residential houses near the sports field. Also, the high intensity of the lamps can cause glare to such homeowner or create safety issues for drivers on nearby roads. Some communities have enacted laws regulating how much glare or spill light can be caused by sports lighting or other wide-area outdoors lighting. While a number of attempted remedies exist, many result in blocking, absorbing, or otherwise reducing the amount of light going to the field. This can not only increase cost of the lighting system because of the glare or spill control measures, but in some cases requires additional fixtures to meet minimum light quantity and uniformity specifications. More cost might therefore be incurred, to make up for the light lost in glare and spill control measures. In some cases, it can even require more costly and/or additional poles to support the additional fixtures. Arrays can be more quickly and efficiently erected on poles if at least partially factory pre-assembled and the fixtures are either pre-aimed or are aimable prior to elevating the pole. All that would remain is to ensure the rotational position of the pole is accurate. However, this is not a trivial task. What might otherwise be considered a small departure from the correct rotational position could mean a significant departure from the desired or planned uniformity and intensity of light on the target. It also could mean significant light is shifted or spilled outside the target, than if vertical plane of the array is correctly oriented to the target by the correct rotational position of the pole around its vertical axis.

II. SUMMARY OF THE INVENTION

The present invention relates to a method for efficiently checking for correct rotational position of a pole supporting an array of lighting fixtures pre-aimed relative to a target area. The method includes placing a marking or indicia on the lens of one of the fixtures in the array. By standing in the designed aiming location for that fixture in the target area, and using optical assistance, e.g. binoculars, the marking or indicia is viewed by the lighting system installer. If the appropriate portion of the fixture behind the marking or indicia on the fixture lens lines up in the field of view of the installer through the optical assistance, it can be assumed the fixture is corrected aimed, and thus the whole array of fixtures is in the correct vertical rotational plane, by assuming the pole is correctly rotated around its vertical axis. It can also then be assumed all fixtures in the array are correctly aimed.

A. Objects, Features, or Advantages, of the Invention

It is therefore a principal object, feature, or advantage of the present invention to present a high intensity lighting fixture, its method of use, and its incorporation into a lighting system, which improves over or solves certain problems and deficiencies in the art.

Other objects, features, or advantages of the present invention include such a fixture, method, or system which can accomplish one or more of the following:

a) more effectively utilize the light produced at each fixture relative to a target area;

b) can reduce glare and spill light relative a target space or area.

These and other objects, features, advantages and aspects of the present invention will become more apparent with reference to the accompanying specification and claims.

III. BRIEF DESCRIPTION OF THE DRAWINGS

A. General Sports Lighting Systems

FIG. 1A and its sub-parts B–F illustrate generally a sports lighting system, and conventional components for a sports lighting system.

B. General Parts of Fixture 10

Figure 2:
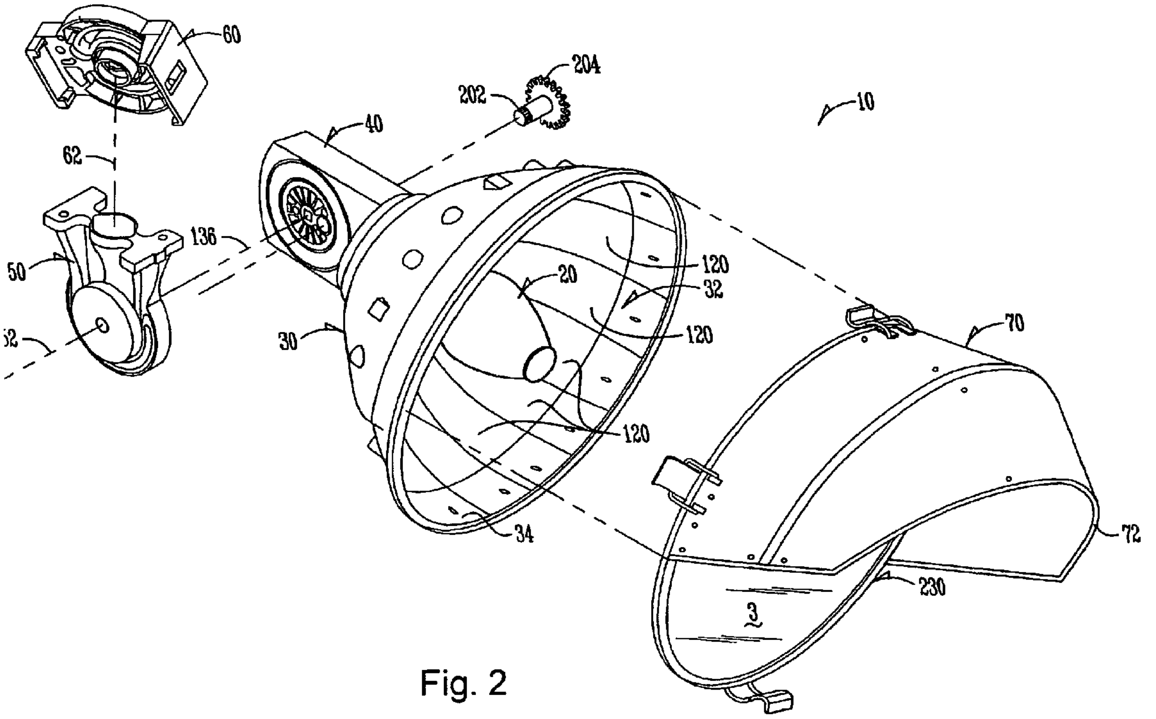

FIG. 2 is a diagrammatic, partial exploded view of a light fixture 10 according to an exemplary embodiment of the present invention.

IV. DETAILED DESCRIPTION OF EXEMPLARY EMBODIMENTS

A. Overview

Figure 1C:
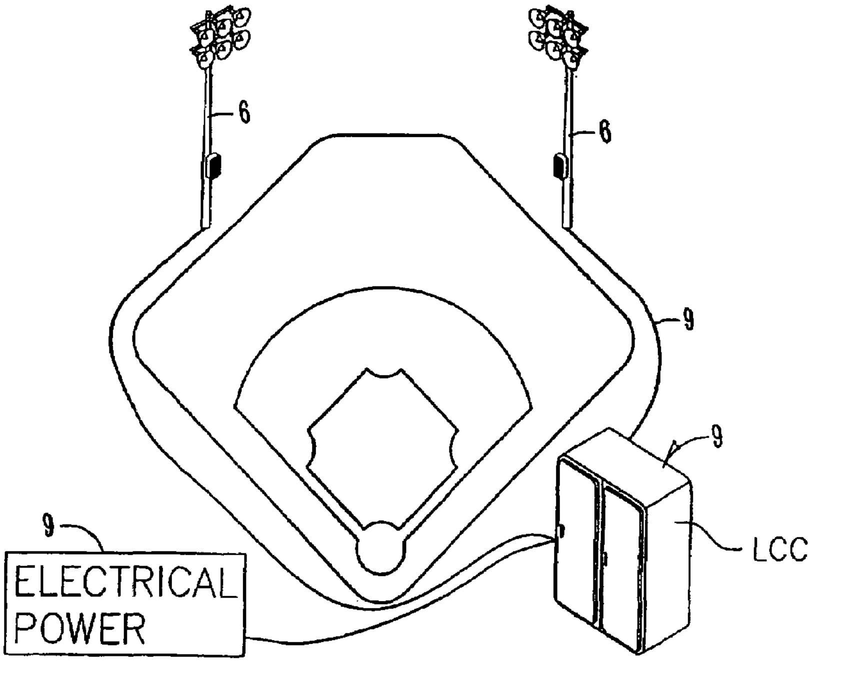
Figure 1D:
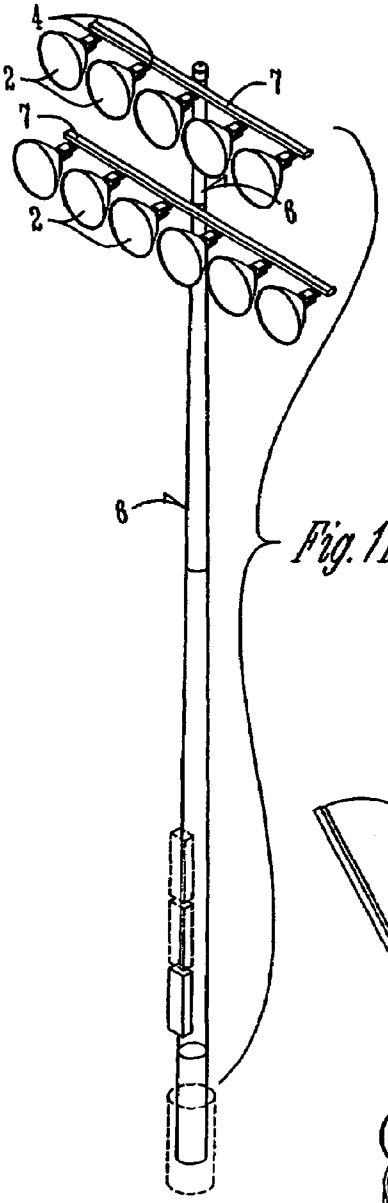
Figure 1G:
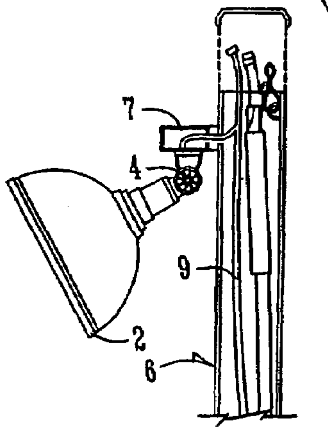
Figure 1E:
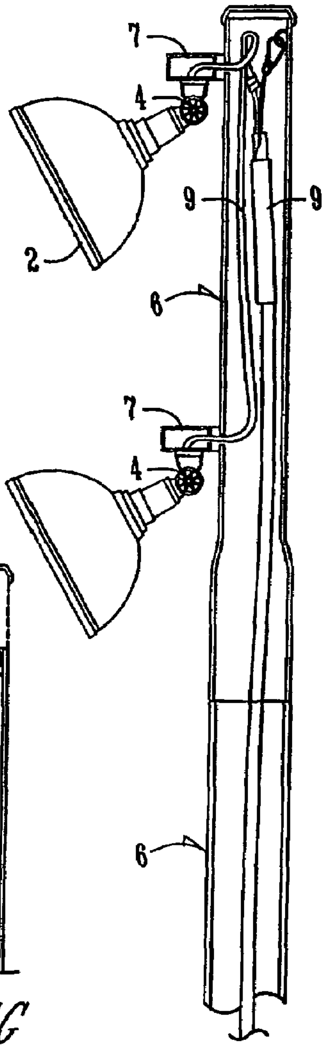
Figure 1F:
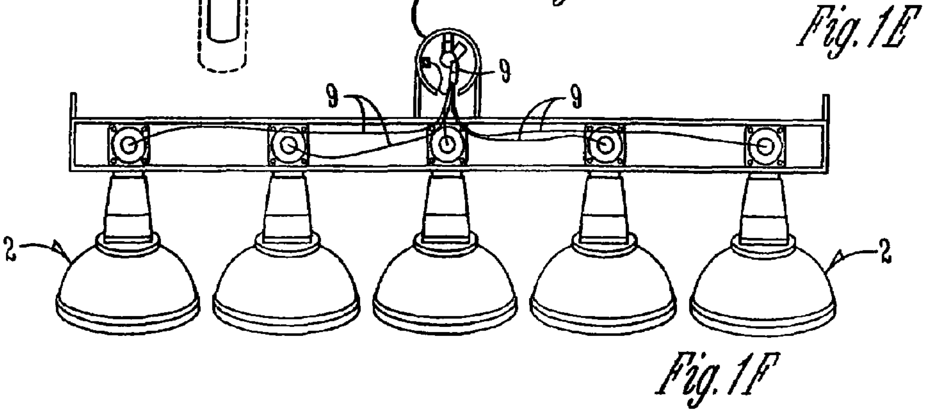

An embodiment of a light fixture will be described in the context of sports lighting, sports lighting fixtures, and sports lighting systems for the illumination of athletic fields such as shown in FIGS. 1A and 1C. The lighting must light the field and a volume of space above the field (collectively sometimes called the target area or target space), according to predetermined lighting level and uniformity specifications. The embodiment relates to fixtures that utilize high intensity discharge (HID) lamps, presently normally 1,000 watts or higher, of the metal halide type. Such installations generally have several arrays of fixtures usually elevated on two or more relatively tall poles (35 feet to 100 or more feet). Electrical power to the systems normally comes from commercial service to a control cabinet. Electrical power is then distributed out to individual poles having individual ballast boxes which, with wiring, distribute electrical power to each light fixture at the top of each pole (see, e.g., FIGS. 1A–1E).

B. Exemplary Apparatus

1. Lighting Fixture 10 Generally

FIG. 2 shows the basic components of sports lighting fixture 10 in exploded form. Fixture 10 has some similar general components to state-of-the-art sports lighting fixtures, but introduces some different structural components and concepts.

C. Assembly and Use

In practice, a set of fixtures 10, such as described above, would be used in a sports lighting system customized for a particular sports field. Lighting specifications (usually including light quantity and uniformity minimums; and sometimes glare, spill, and halo light limitations) are usually prepared or known. As is well known in the art, computer software can design the lighting system, including what types of beams and beam shapes from how many fixtures at what locations are needed to meet the specifications. It can generate a report indicating number of fixtures, pole locations, beam types, and aiming angles to meet the design.

As described above, fixtures 10 can be assembled to produce a wide variety of beams and commonly used beam shapes for sports lighting. Using the report, a set of fixtures 10 can be pre-assembled at the factory. The appropriate reflector frame 30 for each beam type called for in the report can be pulled from inventory by the assembly worker.

Fixtures 10, a pole top with pre-assembled cross arms 7, and poles are shipped to the field to be lighted, along with aiming diagrams, showing how each pre-designed fixture should be aimed relative the field. The entire system, namely poles and bases for the poles, cross arms, fixtures, wiring, ballast boxes, etc. can substantially pre-assembled at the factory (see Musco Patent No. 5,600,537, incorporated by reference herein). This pre-assembled system is available from Musco Corporation under the Light Structure™ brand name.

At ground level, knuckle plates 60 are attached to cross arms 7 and the appropriate fixture 10 is attached to its appropriate knuckle plate 60 by its knuckle 50 (after wiring for that fixture is connected to pre-wiring in cross arm 7. The knuckle for each fixture 10 is adjusted to match the indicated aiming for that fixture 10 according to the aiming diagram (using the pole as a reference point, as described later). Once aimed, the inner and outer knuckle straps and knuckle stop strap are bolted in place so that the correct aiming position for the fixture is set. Any pivoting of fixture 10 above or below the reference position for arc tube 12 will result in automatic tilt factor correction movement of yoke 80 for that lamp 20.

The poles are erected vertically. Electrical power from a control cabinet is connected to each ballast box on each pole.

1. Fixture Aiming Methods

Accuracy of aiming is important with fixture 10 because the reflecting surfaces are so precise. Several methods are possible to improve reliability of aiming of fixtures 10. To ensure correction rotational alignment of a set or array of fixtures 10 on cross-arms on a pole when being installed, a small centering ring or circle could be imprinted on the lens of one of the fixtures of the array (e.g. ⅛ inch thick, 2½ inch diameter circle of UV degradable yellow ink—see small centered ring 272 on lens in FIG. 1B). It can be concentric with the central axis of the fixture. From the ground with binoculars, a worker can line up the ring and the bulb or back of the reflector with his/her viewing position on the ground and check if that fixture is aimed to the correct pre-determined point on the ground. This has been found to be accurate within inches. It is a cost-effective, simple way to check the alignment of the whole array once elevated. Since each of the fixtures is pre-aimed relative to the cross-arms, checking one fixture is generally sufficient. If there is misalignment, with a slip fit pole on base arrangement, the pole simply is rotated until alignment is achieved.

As can be appreciated from the foregoing description, by placing the small, relatively innocuous indicia on the lens of the fixture, aiming alignment of a fixture from a relatively long distance away can be accomplished. The ring is placed in a known position on the lens. The position on the lens is known relative to other parts of the fixture (here, for example, the bulb behind the lens, or some other observable structure inside the fixture). By simple alignment of the ring with the selected structure inside the fixture, and then line of sight viewing, aiming can be accomplished.

It is to be understood, of course, that the invention can take different forms and embodiments. The precise shape or configuration or nature of the indicia on the lens can vary. Variations obvious to those skilled in the art will be included within the invention.

The indicia could be, for example, a dot or solid shape (e.g. 2" diameter dot, preferably colored). It should be big enough to perceive from several hundred feet away with binoculars but not so big as to block or scatter a significant amount of light.

What is claimed is:

1. A method for checking correct rotational position of a pole with an array of lighting fixtures, each lighting fixture including an arc tube substantially surrounded by a reflecting surface and a glass lens to produce a controlled, concentrated beam that is generally converging in nature from the fixture along an aiming axis to a pre-aimed aiming point on a field, comprising:

a. placing a marking or indicia on a glass lens of one of the fixtures of the array generally along the aiming axis of the fixture;

b. viewing the marking or indicia from the aiming point on the field;

c. determining if there is any offset between the marking or indicia and other structure along the aiming axis of the fixture behind the glass lens;

d. if not, assuming the rotational position of the pole is correct and that aiming of all fixtures in the array is correct;

e. if so, rotating the pole and rechecking according to steps a–c.

2. The method of claim 1 wherein the marking or indicia comprises a circular shape.

3. The method of claim 2 wherein the circular shape has a diameter substantially less than the diameter of the glass lens.

4. The method of claim 1 wherein the marking or indicia does not substantially or materially disrupt the light output from fixture.

5. The method claim 1 wherein the marking or indicia is colored.

6. The method of claim 5 wherein the color is yellow.

7. The method of claim 1 wherein the marking or indicia is visually discernable from many feet away.

8. The method of claim 1 further comprising utilizing the method to check rotational position of each of a plurality poles, each within the array of lighting fixtures.

9. The method of claim 1 wherein each lighting fixture of the array of lighting fixtures is pre-aimed relative to a portion of the pole.

10. A method for checking alignment of a lighting fixture elevated above the ground comprising;

a. placing a marking or indicia on a glass lens of the fixture;

b. viewing the marking or indicia from ground;

c. lining up the marking or indicia with structure in the light fixture behind the marking or indicia;

d. determining if the lighting fixture is aimed correctly from the alignment.

11. The method of claim 10 further comprising including the lighting fixture with the marking or indicia with an array of lighting fixtures, the array aimed together and each having a pre-known orientation relative to the other.

12. A lighting fixture comprising;

a. a housing;

b. a reflective surface within the housing;

c. an opening covered by a glass lens;

d. a marking or indicia on the glass lens placed in a pre-determined position relative to other structure inside the housing that would be visible from a distance away from the light fixture;

e. so that when elevated, visual line of sight alignment of the marking or indicia on the glass lens with the structure inside the housing allows a check of orientation of the fixture relative to the line of sight.

13. The fixture of claim 12 wherein the marking or indicia is a relatively small circle on the lens.

* * * * *